Figure 1:
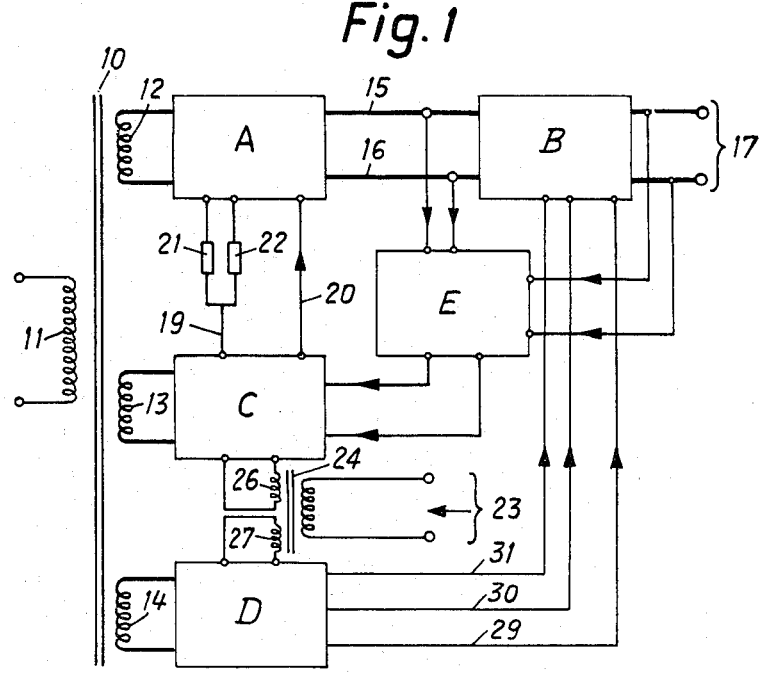

United States Patent Office 3,259,827
Patented July 5, 1966

3,259,827
FREQUENCY TRANSFORMER INCLUDING IMPROVED INVERTER CIRCUIT
Walter Strohmeier, Riehen, Basel-Land, Switzerland, Julio Gonzales Bernaldo de Quiros, Madrid, Spain, and Werner Ullmann, Ascona, Switzerland, assignors to Agie A.G. für industrielle Elektronik, Losone-Locarno, Switzerland, a corporation of Switzerland
Filed Dec. 10, 1962, Ser. No. 243,527
Claims priority, application Switzerland, Dec. 13, 1961, 14,454/61
9 Claims. (Cl. 321—4)

The present invention has reference to an improved static frequency transformer or frequency converter of the type comprising a power rectification stage and an output stage provided with controlled rectifiers for transforming the direct-current voltage into an alternating-current voltage, and further comprises an ignition circuit for igniting the controlled rectifiers of the output stage.

Frequency transformers or converters of this type are known to the art. They are provided in the output stage with a transformer, the primary of which is connected with a pole or terminal of the power rectification stage via a respective controlled rectifier, whereas the other pole or terminal of the power rectification stage is electrically coupled with the center-tap of the primary winding of said transformer. The two controlled rectifiers are alternatingly ignited, whereby a commutation capacitor is electrically coupled with the terminals of the primary winding for extinguishing the control rectifier which is already conductive during a given phase. It will thus be readily apparent that, frequency transformers of the aforementioned type can only then operate satisfactorily if it is guaranteed that the charging of the capacitor is actually sufficient when one controlled rectifier is ignited to extinguish during such period of time the other still conducting rectifier.

Should such extinguishing not occur, for example in consequence of a pronounced secondary side loading of the transformer, then both controlled rectifiers would be conductive which, in consequence of the high current, could directly lead to a destruction of the transformer and the rectifiers. It is thus to be seen that a satisfactory operation of the frequency transformer is dependent upon the commutation, or upon the charging of the commutation capacitor. However, in previously employed circuits the charging of the commutation capacitor is a function of the load at the output of the frequency transformer. With a pronounced loading, the voltage appearing at the terminals of the primary winding again falls after an initial increase which also again reduces the charge of the commutation capacitor. Similarly, a very pronounced reactive load at the secondary side can also have the consequence of reducing charging of the commutation capacitor.

According to the present invention there has now been proposed in order to prevent such disadvantages, to arrange in series a rectifier directly at each of the terminals of the primary winding for load-independent charging of the commutation capacitor. By virtue by this measure, there is achieved the result that the commutation capacitor always charges to the highest voltage which appears during a half-wave since a partial discharging of this capacitor is prevented by the rectifiers.

The invention further relates to an advantageous arrangement or construction of the ignition circuit for the controlled rectifiers of the power output stage, by means of which there is achieved the result that also during a half-wave a controlled rectifier will be reignited if, for any reason, it should become extinguished. The inventive frequency transformer is particularly suitable as a generator for electro-erosion processes, since it also will not become damaged with a very pronounced secondary side loading, as such for example results during a short-circuit which may be caused by contacting of the tool electrode and the workpiece. Quite obviously, the inventive frequency transformer is capable of additional uses as will be apparent to those versed in the art. Thus, for example, the inventive frequency transformer can also be employed as generator for inductive heating, for generation of ultrasonics, for illuminating purposes, and for welding techniques. Further, such frequency transformer can be employed for command installations for power supply networks.

Accordingly, an important object of the present invention is the provision of an improved frequency converter including means enabling load-independent charging of a commutation capacitor.

Another important object of the present invention is the provision of an improved frequency converter reliably ensuring for extinguishing of one controlled rectifier when another controlled rectifier is ignited.

A further important object of the present invention is to provide improved means for re-igniting a controlled rectifier which has improperly extinguished.

Still another important object of the present invention is to provide an improved frequency transformer readily suitable as a voltage generator, particularly for electro-erosion tool machines.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
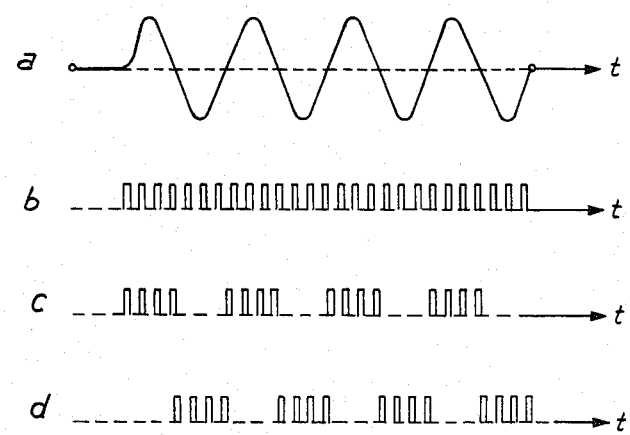
Figure 3:
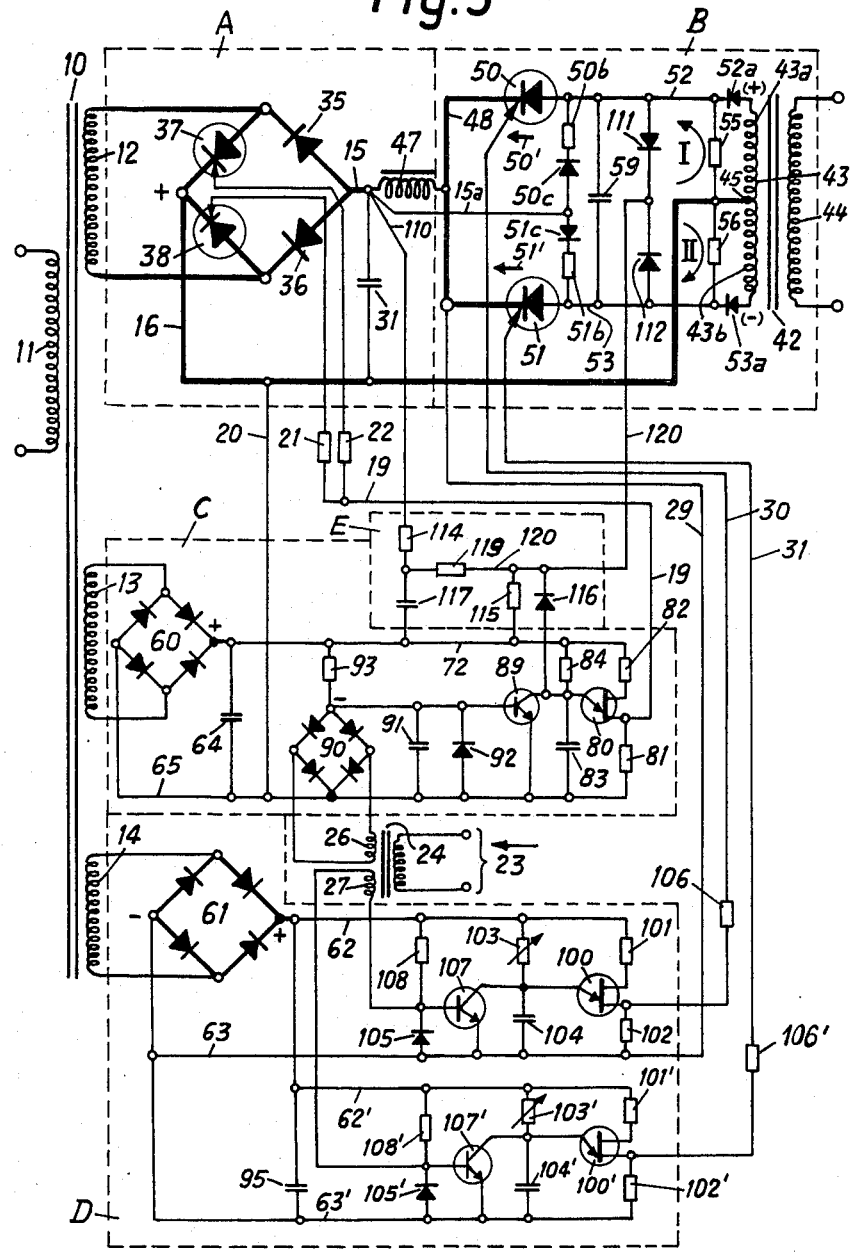

In the drawings:

FIGURE 1 is a block diagram of a frequency transformer or converter;

FIGURE 2 diagrammatically illustrates the series of ignition impulses necessary for igniting the controlled rectifiers taken with respect to the supplied control voltage; and FIGURE 3 is a circuit diagram illustrating details of the frequency transformer or converter shown in FIGURE 1.

Referring now to the frequency transformer or converter illustrated in the block diagram of FIGURE 1, it will be seen that the input load or energy is applied through a transformer 10 via its primary winding 11. The primary winding can for example be directly connected to a power supply of 220 volts and operating at a frequency of 50 c.p.s. The transformer 10 is provided with three secondary windings 12, 13 and 14. The secondary winding 12 is connected to a full-wave rectifier provided for the power-rectification stage A which rectifies the supplied or input alternating-current voltage. The power rectification stage A contains four dry-disk rectifiers or metallic rectifiers 35, 36, 37, 38 (FIG. 3) arranged in a full-wave bridge rectification circuit. Two of these rectifiers 37, 38 are constructed as controlled semi-conductor rectifiers. The direct-current voltage appearing at the conductors 15 and 16 reaches the power output stage B where the direct-current voltage is transformed into an alternating-current voltage of predetermined frequency. The alternating-current voltage then appears at the output terminals 17.

The secondary winding 13 of the transformer 10 feeds an ignition circuit C. As will be more fully explained hereinafter, the ignition circuit C first rectifies the input alternating-current voltage and produces a series of impulses for igniting the two controlled rectifiers 37, 38 of the power rectification stage A. In order to ignite the controlled rectifiers 37, 38 of the power rectification stage A, the ignition circuit C supplies a continuous series of impulses via the conductors 19 and 20. The conductor 19 is electrically coupled with the ignition electrodes of the two rectifiers 37, 38 through the agency of resistors 21 and 22.

The desired frequency of the output voltage appearing at the terminals 17 is determined by a controlling or control alternating-current voltage supplied through the terminals 23 of an input transformer 24. This transformer 24 possesses two secondary windings 26 and 27, wherein the secondary winding 26 is operatively connected to the ignition circuit C. The ignition circuit C is therewith so constructed that, it only then supplies output impulses via the conductors 19 and 20 when an input signal appears at the transformer terminals 23. If a signal fails to appear at the terminals 23 and, thus also not at the secondary winding 26, then the ignition circuit C does not deliver any impulses, so that there also does not appear a direct-current voltage at the conductors 15 and 16. A consequence thereof is that also practically no power is removed at the power supply network to which the primary winding 11 of the transformer 10 is connected when the control alternating-current voltage fails to appear at the terminals 23 of the input transformer 24.

The secondary winding 27 of the input transformer 24 is operatively connected to an ignition circuit D which provides the ignition impulses for the two controlled rectifiers 50, 51 of the power output stage B. The ignition impulses for one of the two controlled rectifiers of the power output stage B, such as rectifier 50 appear across the connecting terminals 29 and 30, whereas the ignition impulses for the second controlled rectifier 51 appear across the conductors 29 and 31.

The frequency transformer or converter of FIGURE 1 additionally contains a safety or security circuit E. This safety circuit E is, on the one hand, electrically coupled with both of the direct-current carrying conductors 15 and 16 at the input side of the power output stage B and, on the other hand, is connected with the output terminals 17 at the output side thereof. The safety circuit E forms a logical element or circuit which always cuts-off or prevents the generation of ignition impulses in the ignition circuit C for a predetermined time when a voltage appears at the conductors 15, 16, whereas when no voltage appears at the output terminals 17. On the other hand, the logical element permits generation of ignition impulses when a voltage appears at the output terminals 17, as well as then when no voltage appears at the conductors 15, 16 as well as none at the output terminals 17. By virtue of the safety circuit E there is thus caused to be ensured that the different controlled rectifiers cannot become damaged, for example, by a short circuit appearing at the output terminals 17.

If, during operation, there appears at the input terminals 23 of the input transformer 24 a controlling or control alternating-current voltage of arbitrary frequency within a large range, there is first of all brought about a rectification in the power rectification stage A, and further there is produced an alternating-current voltage possessing the supplied frequency at terminals 23, which then appears at the output terminals 17.

In order to more fully explain the function which the ignition control circuits C and D fulfill reference is made hereinafter to FIGURE 2. In FIGURE 2a there is depicted the controlling or control alternating-current voltage as a function of time which is applied to the terminals 23 of the input transformer 24. When the voltage supplied at terminals 23 reaches the ignition circuit C there is released an oscillation so that a regular, that is to say, uninterrupted or continuous series of impulses appear at the conductors 19 and 20, as such is approximately illustrated in FIGURE 2b. The pulse repetition rate or pulse recurrence frequency is itself given through the oscillating system and is largely uncritical.

The series of impulses illustrated in FIGURE 2b now reach the two controlled rectifiers 37, 38 of the power rectification stage A via the resistors 21 and 22, whereby it is insignificant that these ignition impulses are maintained during both half-waves, and indeed for the reason that, the ignition impulses cannot then influence the controlled rectifiers when the polarity of the voltage applied to the main line path corresponds to the high resistance or blocking direction of the rectifiers.

In the ignition circuit D two series of impulses are generated, whereby the first series of impulses as shown in FIGURE 2c, appear only for example during the positive half-wave of the controlling or control alternating-current voltage (FIGURE 2a), and the second series of impulses illustrated in FIGURE 2d appear only during the negative half-wave of the controlling or control alternating-current voltage (FIGURE 2a). The voltage of FIGURE 2c appears for example between the conductors 29 and 30, and the control alternating-current voltage of FIGURE 2d between the conductors 29 and 31. The pulse repetition rate of the series of impulses of FIGURES 2c and 2d is again independent of the frequency of the control voltage, but must however lie above such. Advantageously, this pulse repetition rate or pulse recurrence frequency is adjustable, as will be explained hereinafter.

The mode of operation and the construction of the individual power circuits and control circuits will now more fully be discussed hereinafter with reference to FIGURE 3, which illustrates a circuit diagram of the frequency transformer or converter. In the drawings the conductors which transmit the power have generally been shown in thickened black lines. In the illustrated embodiment the power output stage B with the ignition circuit D is depicted as parallel inverter. However, it is equally possible to use a series inverter. This provides the same result.

As has been already mentioned with respect to FIGURE 1, the illustrated frequency transformer or converter is so constructed that it can be connected to a commercial power supply of, for example, 220 volts and operating at a frequency of 50 c.p.s. In order to connect such with the power supply there is provided a transformer 10 which, in addition to the primary winding 11, is provided with three secondary windings 12, 13 and 14. The secondary winding 12 is operatively connected to the power rectification stage A comprising the semi-conductor rectifier elements 35, 36, 37 and 38 arranged in a full-wave bridge rectification circuit. The rectifier elements 35 and 36 can be standard barrier layer rectifiers, whereas as previously mentioned the rectifier elements 37 and 38 are controlled rectifier elements with pnpn-semi-conductor barrier layers.

The two controlled rectifiers 37 and 38 which are electrically coupled to the conductor 16, which can be viewed as the positive pole or terminal of the direct-current voltage source, are ignited by the ignition circuit C by means of the aforementioned series of impulses, in such a manner that the full-wave bridge rectification circuit A operates as a normal bridge circuit. If the ignition impulses from the control ignition circuit C do not appear, then a direct-current voltage can no longer be produced, so that the power network connected to the primary winding 11 is no longer loaded by the frequency transformer. Both of the non-controlled rectifier elements 35 and 36 are connected to the conductor 15 which represents the negative pole or terminal of the direct-current outlet side of the rectification stage A. Between the two poles or terminals of the conductors 15 and 16 there is provided in known manner a smoothing capacitor 31. The conductors 15 and 16 conduct the direct-current voltage produced in the power rectification stage A to the power output stage B, in the latter of which this direct-current voltage is transformed into an alternating-current voltage of predetermined frequency.

The power output stage B operating as a direct-current to alternating-current inverter contains an output transformer 42 provided with a primary winding 43 and a secondary or output winding 44. The primary winding 43 possesses a center-tap 45 which divides the primary winding 43 into the winding sections or portions 43a and 43b. The illustrated conductor 16 for the positive pole or terminal of the direct-current voltage source is coupled to the center-tap 45 of the transformer winding 43, whereas the illustrated conductor 15 for the negative pole or terminal of the power rectification stage A is connected to a conductor 48 through the intermediary of a choke or impedance coil 47, connected to the respective cathodes of two controlled semi-conductor rectifier elements 50 and 51. The controlled rectifier elements 50 and 51 are in principle similarly constructed as the controlled rectifier elements 37 and 38 of the power rectification stage A. The anodes of the controlled rectifiers 50 and 51 are each connected with a respective end-point or terminal of the primary winding 43 of the output transformer 42 through the agency of the conductors 52 and 53, respectively, and the diodes 52a and 53a, respectively. Finally, the controlled rectifiers 50 and 51 are each bridged by a series arrangement or connection comprising a resistor 50b and 51b, respectively, and a diode 50c and 51c, respectively. The anodes of the diodes 50c and 51c are, for example, electrically coupled via a conductor 15a directly to the conductor 15. Further, between or across the conductors 52 and 53 there is connected a capacitor 59 which influences commutation, as such will be more specifically described hereinafter.

In order to more fully explain the operation of the power output stage B, it is to be assumed that for a given period of time the controlled rectifier 51 is ignited, so that a current can flow in the direction of the arrow 51'. The current thereby flows from the positive pole or terminal of the rectification stage A, that is through the conductor 16 over the transformer winding section 43b, the diode 53a, the conductor 53, the controlled rectifier 51, the conductor 48, the choke coil 47 and the conductor 15 to the negative outlet pole or terminal of the power rectifier stage A. The current thereby flows through the current circuit designated with reference numeral II, where in consequence thereof the change of flux associated with the rise in current induces a voltage in the secondary 44 of the transformer 42. At the same time, there is induced a voltage in the other winding section of the primary winding 43, that is in the winding section 43a, so that there is formed at the terminals of the entire primary winding 43 a voltage with the polarity indicated in parenthesis by (+) and (−), in a manner shown in FIGURE 3 of the drawing. Correspondingly, the capacitor 59 charges. It will thus be recognized that a voltage is applied during this period of time to the blocked controlled rectifier 50 in the blocking or high resistance direction, which voltage corresponds to double the output voltage of the power rectifier circuit A. The controlled rectifiers 50 and 51 must thus be dimensioned in such a manner that they are able to withstand this double voltage.

It is now to be assumed that the controlled rectifier 50 is ignited, so that its resistance in the forward direction becomes negligibly small. Thus, there is applied to the controlled rectifier 51 for a short period of time the stored charge of the capacitor 59, and indeed, such is applied in the blocking or backward direction so that this controlled rectifier element 51 is extinguished. Since the controlled rectifier element 50 is now ignited a current flows in the current circuit I, which comprises the conductor 16, the primary winding section 43a of the output transformer 42, the diode 52a, the conductor 52, the controlled rectifier 50, the conductor 48, the choke coil 47 and the conductor 15. It will thus be seen that, in the second phase of the alternating-current voltage at the output side of the frequency transformer the polarity at the winding 43 is reversed. The capacitor 59 charges, in contrast with the first phase, with opposite polarity and thereby stores the charge which is necessary after a renewed ignition of the controlled rectifier 51 to bring about an extinguishing of the controlled rectifier 50. The core of the transformer 42 during this phase is magnetized in the opposite direction, so that on the secondary side 44 of this transformer an alternating-current voltage can be removed.

The diode 50c, 51c are provided in order to achieve that the commutation capacitor 59 after commutation can quickly discharge as well as also quickly charge in the opposite direction. The diodes 52a and 53a, on the other hand, ensure that the capacitor 59 is able to retain as high a charge as possible and will not partially discharge during a dropping of the voltage at the primary winding 43 of the transformer 42 during a half-wave of the output voltage, for example as a result of a pronounced load appearing at the output.

There exists the danger particularly during idle operation, that is without a load at the secondary 44 of the transformer 42, that the voltage amplifies. The capacitor 59 and the primary winding 43 of the transformer 42 thereby operate as an oscillating circuit. In order to prevent such voltage amplitude increases there is arranged parallel to both of the primary winding portions 43a and 43b a respective resistor 55 and 56. Shortly, after the first phase, that is when the polarity of the voltage at the transformer 42 corresponds to the signs indicated in parentheses in FIGURE 3, the capacitor 59 can discharge through the resistors 55 and 56. The rating or size of the resistors 55 and 56 must thus be such that the charge can still be maintained until, for example, the controlled rectifier 50 is extinguished. The resistors 55 and 56 thereby dampen the oscillating circuit, so that the voltage cannot increase in amplitude. It is further to be mentioned that the capacitor 59 can, of course, also be coupled to the secondary winding 44 of the transformer 42, whereby the same mode of operation is achieved.

There will now hereinafter be described the ignition circuits C and D for the controlled rectifier elements. In order to generate the feed or supply voltage for the ignition or control circuit C there is connected to the secondary winding 13 of the input transformer 10, a full-wave rectifier circuit 60 which contains four individual rectifier members. In order to smooth the direct-current voltage produced in this manner, there is provided a smoothing capacitor 64. The negative pole of the direct-current voltage derived in this manner is formed by the conductor 65, and is coupled with both of the connected cathodes of the power rectifiers 37 and 38 via the conductor 20.

The control or ignition circuit C contains a so-called double-base transistor 80, the two bases of which are connected with the negative and positive poles or terminals of the supply voltage source via the resistors 81 and 82, respectively, that is with the conductors 65 and 72 respectively. Such double-base transistors, or unijunction transistor-transistors of such type, are available on the market. They have the characteristic of suddenly or unsteadily changing the resistance between a base electrode and the emitter as a function of the voltage at such emitter. If, in the previously described embodiment, the potential at the emitter lies below a predetermined critical value, then the resistance between the emitter and the one base electrode is high. If the voltage at the emitter increases, for example by the charging of a condenser to this critical value, then the point will be reached at which the resistance between the base electrode and the emitter will suddenly become smaller. The emitter in the above described instance is connected with the conductor 65 via a capacitor 83 and is connected to the conductor 72 via a resistor 84. The capacitor 83 and the resistor 84 thereby form an RC-member. The capacitor 83 charges up to the critical voltage in accordance with the time-constant of the RC-member, whereupon at the resistor 81 a positive impulse appears in consequence of the discharging of the capacitor 83 through the transistor 80. After the discharge of the capacitor 83 the voltage falls below a predetermined value and the transistor 80 again becomes blocked, so that the charging of the capacitor can begin again. The system formed of the members 80–84 thereby operates as an oscillator or impulse generator, whereby the pulse recurrence frequency is a function of the dimensions of the RC-member. In the aforementioned case, the frequency is considerably higher than that of the power supply network, so that for each half-wave a larger number of impulses arrive at the controlled rectifiers 37 and 38. The pulse repetition frequency of the ignition impulses of ignition circuit C is larger than the frequency of the input alternating-current voltage to be rectified, and preferably exceeds such by at least a factor of 3. The rectifiers 37, 38 are thereby also ignited during each half-wave if, for any reason, such should become extinguished.

The impulses appearing at the resistor 81 are transmitted to the ignition electrodes of the controlled rectifiers 37 and 38 through the intermediary of the conductor 19 and via a respective protective resistor 21 and 22, as best seen by an inspection of the circuit diagram of FIGURE 3. The two controlled rectifiers 37 and 38 are thereby always then ignited when the resistance between the two base electrodes and the emitter of the transistor 80 suddenly changes and when a voltage appears in the forward direction at the controlled rectifiers. This is always the case with one of the two controlled rectifiers. Arranged in parallel to the capacitor 83 is a further transistor 89 which short-circuits the capacitor 83 when no negative potential or voltage appears at its base electrode. Between the base of the transistor 89 and the conductor 65 there is disposed the direct-current side of a full-wave rectification circuit 90, the alternating-current side of which is coupled to the secondary winding 26 of the input transformer 24. As has been previously mentioned, the control alternating-current voltage is delivered to the primary side of the transformer 24. Arranged in parallel to the direct-current side of the bridge rectification circuit 90 is a capacitor 91 and a protective diode 92.

The base electrode of the transistor 89 is further connected via a resistor 93 to the conductor 72 which represents the positive pole or terminal of the power rectifier 60. If, now, a voltage does not appear at the secondary winding 26 of the transformer 24, then the base of the transistor 89 is held at a positive potential through the resistor 93, so that the transistor 89 is conductive and the capacitor 83 cannot charge. A consequence hereof is that, the transistor 80 is blocked and no ignition impulses can be delivered to the controlled rectifiers 37 and 38. Thus, a direct-current voltage does not appear between the conductors 15 and 16. On the other hand, if there appears a signal at the terminals 23 of the transformer 24 then the capacitor 91 charges so that there appears a negative potential at the base of the transistor 89 which blocks this transistor. The result of this is that, the capacitor 83 can charge and ignition impulses can again arrive at the controlled rectifiers 37 and 38. If the control alternating-current voltage does not appear at the terminals 23, the capacitor 91 discharges through the protective diode 92 so that the transistor 89 again becomes conductive and impulses no longer appear at the transistor 80 or resistor 81.

The ignition circuit D serves to produce the control impulses for the controlled rectifiers 50 and 51 in the power output stage B designed as a direct-current to alternating-current inverter. In order to produce the supply direct-current voltage for the ignition circuit D, there is electrically coupled to the secondary winding 14 of the transformer 10 a rectification bridge circuit 61. The positive pole or terminal of the thus constructed direct-current voltage source is formed through the conductor 62 and the negative pole by the conductor 63 or 63′. In order to smooth the direct-current voltage there is connected across these conductors 62 and 63′ a smoothing capacitor 95. In order to generate the impulses for the controlled rectifiers 50 and 51 there is here provided two individual impulse generators which are identical to one another and are essentially similarly constructed as the impulse generator for the controlled rectifiers 37 and 38. There will now hereinafter be described in greater detail the impulse generator for the controlled rectifier 50 appearing in the upper-half of the illustrated ignition circuit D shown in FIGURE 3, and denoted by reference numerals without a prime marking.

The impulse generator for the controlled rectifier 50 again contains a double-base transistor 100 which is connected with the conductors 62 and 63 through the resistors 101 and 102. The emitter is likewise connected with these conductors 62 and 63 through the intermediary of an adjustable resistor 103 and a capacitor 104. The pulse repetition rate or pulse recurrence frequency adjustable by means of the resistor 103, is transmitted to the control or ignition electrode of the controlled rectifier 50 via the conductor 30 and a protective resistor 106. The frequency determining elements 103 and 104 are so dimensioned or adjusted that the frequency is considerably larger than the frequency of the voltage which is delivered from the power output stage B, or the frequency of the control voltage.

A transistor 107 is arranged in parallel to the capacitor 104 which in the absence of a negative control voltage at its base electrode provides a very small resistance, that is the oscillating system is blocked by short-circuiting of the capacitor 104. The base electrode of the transistor 107 is connected with the conductor 62 via a resistor 108 and with the conductor 63 via a diode 105. Further, the base electrode is coupled to one terminal of the secondary winding 27 of the transformer 24, the primary winding of which is fed with the control voltage whose frequency is to be delivered from the frequency converter. The other terminal of the secondary winding 27 is connected with the base electrode of the corresponding transistor of the second impulse generator, in a manner shown in FIGURE 3. This transistor of the second impulse generator is designated by reference numeral 107′. It will now become apparent that the two transistors 107 and 107′ are alternatingly blocked and opened whereby such alternation always occurs during the zero crossover of the control alternating-current voltage. Correspondingly, always only one impulse generator can deliver the necessary series of impulses for igniting the associated controlled rectifier. For example, during the upper half-wave of the control alternating-current voltage the upper impulse generator of ignition circuit D and shown in FIGURE 3, delivers a series of impulses so that the controlled rectifier 50 is ignited, whereas in the second lower half-wave the lower arranged impulse generator of this FIGURE 3 delivers a series of impulses to the rectifier 51 for its ignition, in the same manner as such has been described in the previous discussion of FIGURES 2c and 2d. It will be recognized that the other impulse generator of ignition circuit D is similar to the one just described, and has corresponding elements identified with like reference numerals but further bear prime markings.

It is here to be mentioned that the controlling or control voltage does not necessarily have to be sinusoidal or regular. On the contrary, it is possible to deliver via the input transformer 24 a series of impulses in which the positive and the negative half-waves appear for different lengths of time. Then also the output voltage at the secondary winding will be correspondingly formed. This can then be of particular importance when the frequency converter is employed as a generator for spark erosion processes. Since the frequency converter immediately begins to operate as soon as a signal appears, that is also within the confines of a half-wave of the control voltage, such converter is exceptionally suitable for power command computers in electrical networks. All of the delivered or supplied series of impulses appear practically inertialess at the output. As already mentioned, practically no load is removed from the supply power network when an input signal does not appear at the input transformer 24.

The safety circuit E serves the purpose of preventing destruction or damage of the rectifiers 50 and 51 if, for example, the output side is short-circuited or when a controlled rectifier is not extinguished in the manner as desired in consequence of a capacitive load. As previously mentioned, the safety circuit E operates as a logical element or circuit. For determining the input signal there is provided the conductor 110, one end of which is connected with the negative pole or terminal of the power rectification stage A or with the conductor 15, in a manner as shown. For determining the output signal two diodes 111 or 112 are coupled to the conductors 52 and 53, the junction point of which is connected to the conductor 120. The conductor 110 is connected to the conductor 120 via two resistors 114 and 119. The conductor 120 is connected via a diode 116 with the emitter of the transistor 80 and via a resistor 115 with the conductor 72. Furthermore, there is arranged between the conductor 72 and the junction point of the resistors 114 and 119 a capacitor 117.

There are now three operating conditions possible. The first operating condition is that occurring by switching-in, that is at that period of time during which there does not appear a voltage at the conductors 15 or 110, or at the conductor 120. In this instance, the ignition circuit C operates in a normal manner since no voltage whatsoever effects the base electrode of the transistor 80, which could disadvantageously influence its mode of operation. The voltage will adjust itself in accordance with the dimensioning of the capacitor 83 and the resistor 84, in a manner as described hereinabove. In the second condition of operation the normal operating voltage appears at the conductor 110 as well as at the conductor 120. The voltage at the conductor 120 is thereby maintained at a positive potential, so that likewise no potential can reach the emitter of the transistor 80 which could disadvantageously influence such.

If, on the other hand, in accordance with the third condition of operation, there appears a voltage at the conductor 110 and there is missing a voltage at the conductor 120, for example in view of a short-circuit, then in consequence of the negative potential which is transmitted to the conductor 120 via the conductor 15, the diode 116 is conductive and the base of the transmitter 80 receives a negative bias voltage, so that the system cannot oscillate. The system then remains blocked for such length of time until the capacitor 117, which is arranged in parallel with the resistors 115, 119 is discharged. In the event that the short-circuit or the loading for a short period of time which has caused the disturbance has in the meantime been corrected, then the system after a renewed build-up or oscillation of the ignition circuit C will again work in the normal desired manner. The safety circuit E is particularly meaningful because of the fact that one of the controlled rectifiers 50 or 51 in consequence of special load requirements cannot be extinguished, so that both controlled rectifiers 50 and 51 are ignited at the same time. The dimensioning of the capacitor 117 and the resistors 115, 119 must be so selected that the transistor 80 becomes blocked for such length of time until the two controlled rectifiers 50 and 51 are positively extinguished. If such is the case, then the frequency converter will continue to operate, whereby the output voltage in consequence of the fact that the ignition results by a series of impulses, will immediately adjust itself to the condition which is determined by the alternating-current voltage appearing at the terminals 23 of the input transformer 24.

Having thus described the present invention, what is desired to be secured by United States Letters Patent is:

1. A frequency transformer comprising a power rectification stage, a source of alternating current voltage for said power rectification stage, a power output stage provided with controlled rectifiers for converting a direct-current voltage into an output alternating-current voltage, an ignition circuit for igniting said controlled rectifiers of said power output stage, said power output stage being provided with a transformer having a primary winding including a center-tap and connected at its primary winding terminals via a respective one of said controlled rectifiers with one terminal of said power rectification stage, the other terminal of said power rectification stage being coupled to said center-tap of said primary winding of said transformer, a capacitor for commutation electrically connected to said terminals of said primary winding, so that upon ignition of one of said controlled rectifiers the other controlled rectifier is extinguished by the charge of said capacitor, and a separate rectifier directly connected in series with each terminal of said primary winding for load-indepedent charging of said commutawinding for load-independent charging of said commuta- 2. A frequency transformer according to claim 1; wherein said power rectification stage includes controlled semi-conductor rectifiers, an ignition circuit for igniting said controlled semi-conductor rectifiers of said power rectification stage, said last-mentioned ignition circuit delivering a series of impulses wherein the pulse recurrence frequency is greater than the frequency of the alternating-current voltage to be rectified.

3. A frequency transformer according to claim 2; wherein said pulse recurrence frequency is greater than the frequency of said alternating-current voltage to be rectified by at least a factor of 3.

4. A frequency transformer according to claim 1; wherein said controlled rectifiers of said power output stage comprise a pair of controlled semi-conductor rectifiers, said ignition circuit for igniting said last-mentioned controlled semi-conductor rectifiers alternatingly transmits to one of both of said controlled semi-conductor rectifiers a series of impulses within each half-wave of said output alternating-current voltage.

5. A frequency transformer according to claim 4; wherein said ignition circuit for said power output stage during each half-wave of said output alternating-current voltage transmits to a respective one of both of said controlled semi-conductor rectifiers at least three individual impulses.

6. A frequency transformer according to claim 2; including an input transformer for a control voltage for regulating the frequency of said output alternating-current voltage, said input transformer including a secondary winding controlling said ignition circuit controlling ignition of said controlled rectifiers of said power output stage.

7. A frequency transformer according to claim 6; wherein said input transformer for said control voltage is provided with a further secondary winding operatively connected with said ignition circuit for igniting said controlled semi-conductor rectifiers of said power rectification stage in such a manner that said last-mentioned ignition circuit only delivers ignition impulses when the voltage at the input transformer for the control voltage exceeds a predetermined value.

8. A frequency transformer according to claim 1; wherein said transformer of said power output stage includes a secondary winding adapted to be connected across a workgap for electro-erosion metal working.

9. In a frequency transformer, particularly adapted for use as a voltage generator for electro-erosion tool machines, a power rectification stage, a power source for said power rectification stage, a power output stage provided with controlled rectifiers for converting a direct-current voltage into an alternating-current voltage, an ignition circuit for igniting said controlled rectifiers of said power output stage, said power output stage being provided with a transformer having a primary winding including a center-tap and connected at its primary winding terminals via a respective one of said controlled rectifiers with one terminal of said power rectification stage, the other terminal of said power rectification stage being coupled to said center-tap of said primary winding of said transformer, a commutation capacitor in circuit with said transformer, so that upon ignition of one of said controlled rectifiers the other controlled rectifier is extinguished by the charge of said commutation capacitor, and rectifier means connected in circuit with said transformer of said power output stage for load-independent charging of said commutation capacitor.

References Cited by the Examiner

UNITED STATES PATENTS

| | | | |
|---|---|---|---|
| 2,785,370 | 3/1957 | Levy | 321—2 |
| 2,977,523 | 3/1961 | Cockrell | 323—22 |
| 3,082,369 | 3/1963 | Landis | 321—45 |
| 3,089,992 | 5/1963 | Seney | 321—4 |
| 3,142,392 | 8/1964 | Sylvan. | |
| 3,146,356 | 8/1964 | Kidwell. | |
| 3,196,336 | 7/1965 | Schmidt | 321—47 X |
| 3,197,691 | 7/1965 | Gilbert | 321—44 X |

FOREIGN PATENTS 1,303,427   7/1962   France.

JOHN F. COUCH, *Primary Examiner.*

LLOYD McCOLLUM, MILTON O. HIRSHFIELD,
*Examiners.*

G. J. BUDOCK, J. C. SQUILLARO, W. H. BEHA,
*Assistant Examiners.*